United States Patent [19]

Ganderton

[11] 4,052,900
[45] Oct. 11, 1977

[54] TRANSDUCERS
[75] Inventor: William Ganderton, Yarm, England
[73] Assignee: Tioxide Group Limited, Billingham, England
[21] Appl. No.: 647,817
[22] Filed: Jan. 9, 1976
[30] Foreign Application Priority Data
  Jan. 11, 1975  United Kingdom ............ 01234/75
[51] Int. Cl.² ........................................... G01F 23/12
[52] U.S. Cl. ...................................... 73/313; 323/50; 336/30; 336/144
[58] Field of Search ..................... 73/313; 323/50, 51; 340/195, 196; 336/30, 136, 144, 137, 138

[56] References Cited
U.S. PATENT DOCUMENTS

| | | | |
|---|---|---|---|
| 1,306,525 | 6/1919 | Cole | 323/50 |
| 2,026,299 | 12/1935 | Boyd | 73/313 |
| 2,424,766 | 7/1947 | Miner | 73/313 |
| 2,708,730 | 5/1955 | Alexander | 323/50 |
| 3,017,589 | 1/1962 | Chass | 336/30 |

*Primary Examiner*—S. Clement Swisher
*Attorney, Agent, or Firm*—Schuyler, Birch, Swindler, McKie & Beckett

[57] ABSTRACT

A transducer having a primary coil and at least one secondary coil wound on a hollow support with a number of electrically conducted links axially spaced along the secondary coil with the links connecting spaced turns of the secondary coil so that the transducer when in use has an output of desired form. The transducer is particularly useful for producing an output voltage from which the position of the core and anything connected to it can be deduced.

23 Claims, 5 Drawing Figures

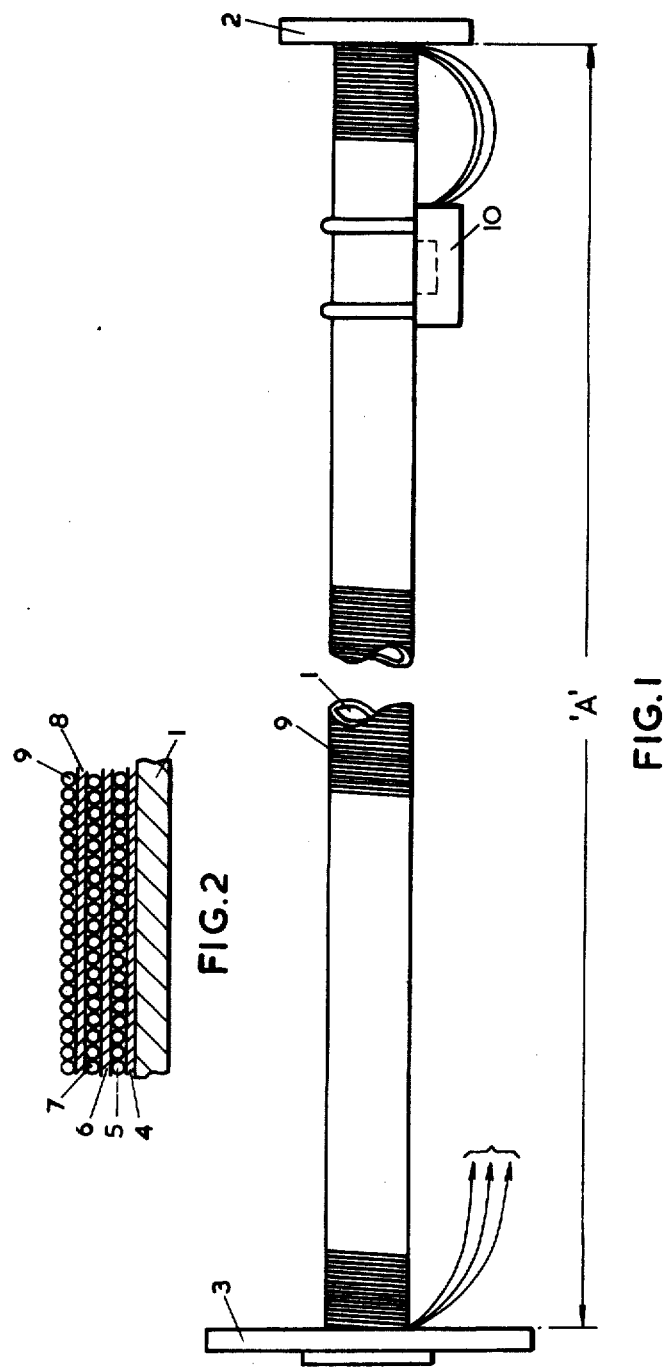

TRANSDUCERS

This invention relates to a transducer and particularly to a transducer having a controllable or variable output of a desired form.

According to the present invention a transducer comprises a hollow support member formed having mounted thereon a primary coil connectable to a source of alternating electric current, a secondary coil mounted around the primary coil, a number of electrically conductive links axially spaced along the length of the secondary coil each link connecting spaced turns of the secondary coil and the ends of the secondary coil being connectable to receiving means for induced electric current at a desired voltage.

The apparatus of the present invention is a transducer which is particularly useful for producing an output voltage across the secondary coil of a desired form when a core formed of a magnetically susceptible material is positioned within the hollow support. Hitherto a transducer consisting of a primary and a secondary coil has produced an output voltage from the secondary coil of non-linear characteristics as a core of magnetically susceptible material is introduced into the transducer. This is disadvantageous, for example when the transducer is to be used to produce an output voltage which is indicative of say changes in the level of a liquid in a tank. In this particular case it would be advantageous if the output voltage varied linearly with the change in level of the liquid in order that a straight line relationship was obtained between the position of the core and the output voltage.

The transducer of the present invention includes a secondary coil of a particular construction so that the output voltage can be varied as desired. This is achieved in effect by shorting out at appropriate intervals along the length of the secondary coil a number of turns of the coil. This shorting out is achieved by interconnecting the turns of the coil to be shorted and this is achieved by the use of interconnecting links which may either be individual length of wire attached to appropriate turns or by interconnecting adjacent turns of the winding together by, for example, an electrically conductive material, such as solder, conductive resin or paint composition until the required number of turns of the winding has been shorted out. Preferably, the transducer includes individual wire links effecting the shorting out and these links are positioned axially along the length of the secondary coils at spaced intervals. Alternatively, the secondary coil may be formed by a number of short coils spaced along the transducer and connected in series by the conductive links.

If desired the transducer may include two or more secondary coils, one advantageous structure includes two secondary coils connected in series the outer one of which carries the conductive links at spaced intervals and the inner one is conventionally wound. The output from the transducer when two or more secondary coils are employed is the sum total voltage across the secondary coils.

The transducer includes a primary coil wound on a hollow support member and usually of cylindrical form. The support may be formed of a suitable metal such as stainless steel, copper or brass or alternatively may be formed of a suitable plastic or resinous type material providing this is able to withstand any heat which may be generated in the transducer during use. The hollow support member may be of any required cross-section and preferably is formed of non-magnetic material. The support and the associated coils may be of any desired length and the structure can extend to a length of say 2 meters or even longer without any associated unexpected disadvantages. Very short transducers of only a few millimeters in length can be constructed in accordance with the invention.

The ends of the support may be provided with retaining flanges to support the ends of the wound coils and if desired additionally to provide a mounting means for the transducer.

The primary coil and secondary coil are formed of electrically conductive wire usually carrying an insulating coating. An insulation layer is usually positioned between the individual coils and also between the primary coil and the support.

Usually the wire forming the primary and secondary coils will be copper wire but any other suitable metallic wire may be used. Normally the wire will have a size of from 16 S.W.G. to 25 S.W.G. and the number of turns of the wire along the length of the transducer will be that obtained by winding the chosen size of wire into a close wound relationship along the length of the transducer.

The number of turns of the secondary coil shorted out by means of the connecting links will depend upon the desired form of the output of the transducer. The number of interconnecting links employed will also likewise depend on the desired linearity of the final output and also on the number of secondary coils employed. Where two secondary coils are employed then it has been found that fewer connecting links are required as when only one secondary coil is included in the transducer.

As stated previously herein the transducer of the present invention enables the form of the output of the secondary coil to be modified. For instance the position of the connecting links and their number can be such that the output of the transducer varies in a linear relationship with the position of the core as it is introduced along the length of the transducer and the structure in this case is such that a 1% variation at most from linearity is attainable.

Generally speaking a larger number of connecting links will be required for a higher degree of linearity of output than for a lower degree of linearity. For instance, for a linearity of within 1% it has been found desirable that at least 10 links be employed whereas for a linearity of within 5% of output about 5 links are required. However, by choice of appropriate lengths of connecting links it has been found possible to obtain within 1% linearity of output by using say 9 links.

For a transducer having a known variation of output at any position of the core within the support it has been found advisable to position the links along the secondary coil according to a particular method of manufacture.

The core may be of bar or tube form and the cross-sectional shape and size is not critical in relationn to the support member. Support bearings may be used, if desired, for a particular application.

According to the invention also a method for the manufacture of a transducer having a desired output variation from linearity comprises winding a primary coil on a hollow support member, winding a secondary coil to enclose the primary coil, positioning along the secondary coil a number of axially spaced connecting links each link connecting spaced turns of the secondary coil, and calibrating said transducer by applying a desired voltage across the primary coil, inserting a core formed of a magnetic material into said support to a desired position along the support to correspond to a particular connecting link, measuring the voltage output across the secondary coil and adjusting the position of attachment of the particular connecting link to the secondary coil to produce the desired output across the secondary coil with the core in the desired position, repeating said calibration after moving said core to correspond to the position of another connecting link until the output across the secondary coil has the desired variation from linearity at any position of the core.

The method for the manufacture of a transducer described in the immediately preceding paragraph permits a transducer to be calibrated in order that the output voltage across the secondary coil has any desired particular form according to the position of the core. Usually the calibration is commenced with the core introduced only a short distance into the support and the output voltage across the secondary is adjusted to be a desired minimum. For convenience the core is then moved to occupy the whole length of the support so that the full range of voltage obtained from the secondary coil can be ascertained. Normally the number of connecting links to be used is decided prior to calibration and these are assembled axially along the length of the secondary on a temporary basis. The final positioning of the interconnecting links is achieved during calibration. The particular method described for the calibration of a transducer enables a transducer to be obtained having a known output variation, and is particularly convenient for the production of a transducer having an output varying only ±0.5% from linearity.

In use the transducer is connected to an appropriate electric circuit to supply an alternating electric current across the primary and an appropriate circuit to detect the output of the secondary coil. Typically the primary may be supplied from a transformer and the secondary may be connected to a voltmeter or a recorder chart via any other necessary electrical equipment.

A transducer in accordance with the invention and having an output voltage variance of only ±0.5% from linearity is particularly useful when employed to produce an output voltage which varies according to the variation in the level of a liquid in a sealed tank. For instance, the core may be connected to a float which moves in accordance with the variation of level of a liquid and the output voltage is indicated on a voltmeter or a recorder chart gives an indication of the level of the variation in level of the liquid in the tank. This type of level indicator is particularly useful when it is desirable that the liquid should be kept out of contact with air and in a sealed container.

Transducers constructed in accordance with the invention can be operated at frequencies of only a few herz up to at least several kHz as required. The transducer is especially convenient to operate at normal electric mains frequency, say 50 to 60 Hz.

When using a transducer constructed in accordance with the present invention the simplest form of electronic circuitry required consists only of a suitable AC electric supply and a suitable voltmeter to measure the output, but if required the instrumentation may consist of an oscillator drive together with a phase-sensitive detector to give DC output.

Operation of the device is not restricted to room temperature, but by the use of suitable materials of construction the transducer will operate satisfactorily at low or at elevated temperatures, the temperature range being limited only by the physical and magnetic properties of the materials of construction.

One of the most important advantages of transducers constructed in accordance with the present invention is that the stroke length of the core is very nearly as great as the overall length of the transducer.

One form of transducer constructed in accordance with the invention will now be described by way of example only with reference to the accompanying drawings in which:-

FIG. 1 is a side elevation of the transducer,

FIG. 2 is a part section through the transducer shown in FIG. 1,

Figure 3:
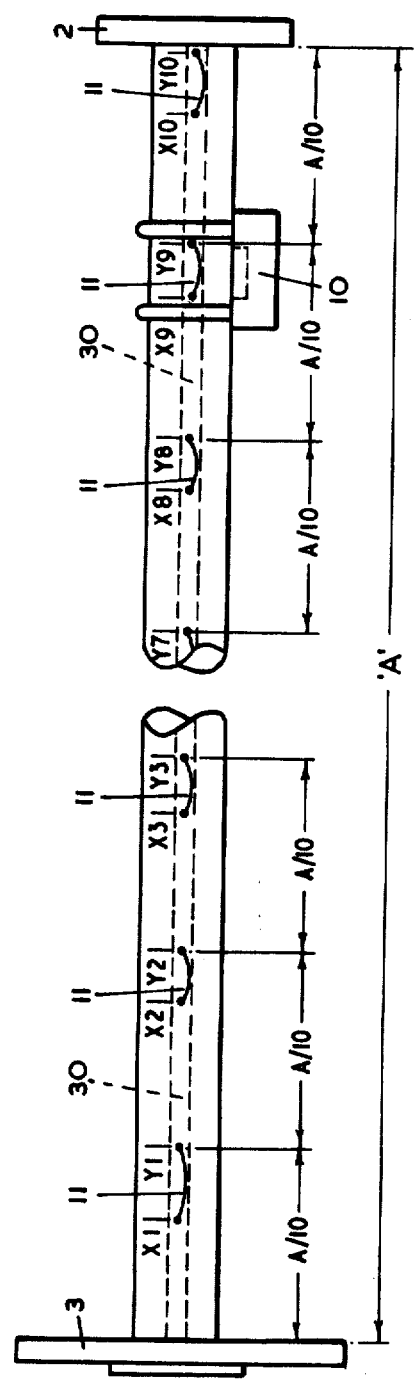
FIG. 3 is a plan view of the transducer in diagrammatic form.

The transducer shown in FIGS. 1, 2 and 3 consists of a hollow cylindrical former 1 of stainless steel having end flanges 2 and 3. The former 1 is wrapped with an insulating layer 4 of glass tape, and carried on this insulating layer 4 is a primary coil 5 formed of insulated copper wire having a size of 22 S.W.G. The primary coil 5 is surrounded by a further insulating layer 6 of glass tape and carried on this insulating layer 6 is a secondary coil 7 formed of similar copper wire to that used to form the primary coil 5. The secondary coil 7 is similarly enclosed by insulating layer 8 of glass tape and an outer or additional secondary coil 9 is wound on this layer 8 of glass tape.

The respective ends of the coils 5, 7 and 9 terminate in a terminal box 10 mounted on the transducer.

The outer coil 9 is surrounded by an insulating layer to protect the whole device.

In FIG. 3 there is shown a plurality of connecting links 11 mounted axially along the transducer and spaced apart. These connecting links 11 connect spaced turns of the outer coil 9 of the transducer.

Figure 4:
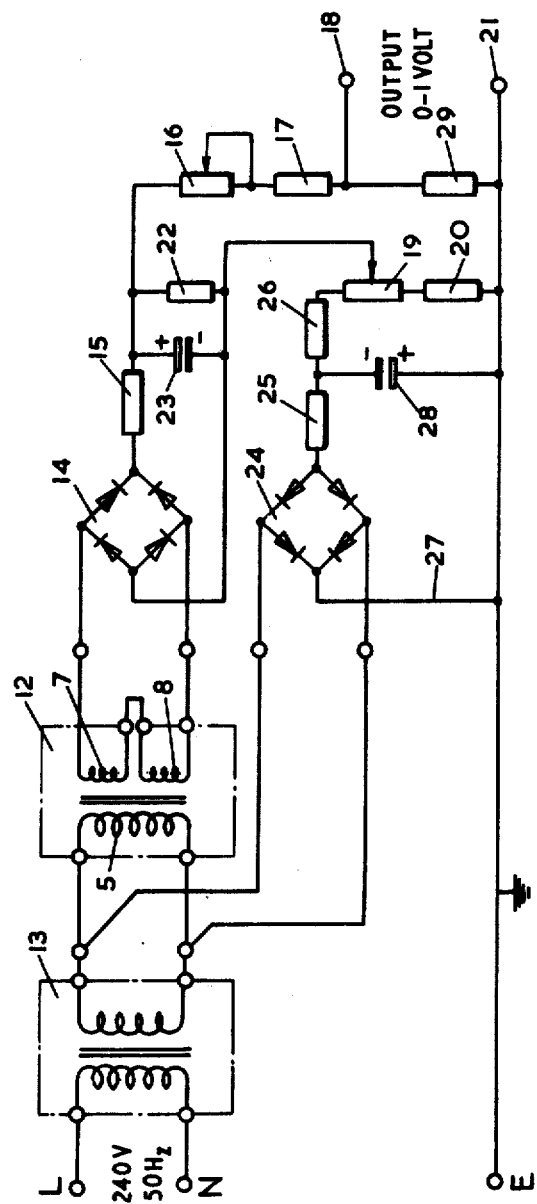
FIG. 4 is a view of the electrical circuitry associated with the transducer shown in FIGS. 1, 2 and 3.

As shown in FIG. 4 the transducer indicated at 12 is shown with its associated electrical circuitry and components. The primary coil 5 of the transducer is shown connected to the output of a constant voltage transformer 13. The secondary coil 7 is shown connected in series with the outer coil 8 and the total output supply across a bridge rectifier 14. One output from the bridge rectifier 14 is connected to a resistance 15 and an adjustable potentiometer 16 and from there through a resistance 17 to an output terminal 18. The other output from the bridge rectifier 14 is taken to another adjustable potentiometer 19 through a resistance 20 to earth and to the other output terminal 21. A shunt comprising a resistance 22 and a condenser 23 is mounted between the two outputs from the bridge rectifier 14.

The supply from the constant voltage transformer 13 to the primary coil 5 is tapped and connected to a second bridge rectifier 24 and an output of this is connected through the resistance 24 and 26 to the adjustable potentiometer 19. The other output is connected to earth via connection 27, and a shunt comprising a condenser 28 is positioned across the outputs from the rectifier 24.

Output 18 is connected to output 21 through a resistance 29.

For the arrangement shown in FIG. 4 with a mains supply to the constant voltage transformer of 240 volts, 50 Hz the values of the resistances and condensers are as follows:-

| | |
|---|---|
| Resistance 15 | 100 ohms |
| Resistance 17 | 22 K ohms |
| Resistance 20 | 47 ohms |
| Resistance 22 | 100 ohms |
| Resistance 25 | 470 ohms |
| Resistance 26 | 47 ohms |
| Resistance 29 | 22 K ohms |
| Condenser 23 | 1000 MFD 16 volts |
| Condenser 28 | 47 MFD 16 volts |
| Adjustable potentiometer 16 | 10 K ohms |
| Adjustable potentiometer 19 | 100 ohms |

The transducer as shown in FIG. 3 is manufactured according to the following procedure during which a particular procedure adopted for calibration of the transducer and positioning of the connecting links is described.

1. The various coils and insulating layers are wound on the support former 1. The length of the coils is 52 inches. The coils are connected as shown in FIG. 4 and a digital voltmeter is connected across the outputs 18 and 21. An electrical supply of 240 volts, 50 Hz, is connected to the constant voltage transformer 13 to energise the transducer and 30 minutes are allowed for warming up prior to procedure further.

2. Adjustable potentiometer 19 is adjusted so that a zero volt reading is obtained on the digital voltmeter without the core being positioned within the transducer. A core formed of a magnetic susceptible material, such as mild steel, is inserted into the transducer 1 through the end carrying the large flange 3 to half-way along the length of the transducer. The zero reading on the digital voltmeter should not vary by more than ± 1 millivolt for any position of the core, and if so the transducer is correctly wound and connected. If variation greater than ± 1 millivolt is noticed then correction is necessary.

3. A strip 30 of the enamel coating of the outer coil 9 is removed along the length of the coil as indicated in FIG. 3. The strip has a width of approximately 13 mm.

4. The length A of the outer winding is notionally divided into 10 equal lengths (A/10) as shown in FIG. 3 and the ten equidistance points are marked Y1 to Y10 as shown.

5. Ten compensating links of polyvinyl chloride insulated wire are prepared.

6. One end of each respective compensating link 11 is soldered to the marked points Y1, Y2 . . . Y10 ensuring that each link is firmly fixed at the end to one coil turn only, and that the solder does not spread to adjacent coil turns.

7. Solder (temporarily) the other end of each compensating link to the approximate mid-point of each of the corresponding measured lengths. These points are shown as X1, X2 . . . X10 in FIG. 3.

8. Re-energise the transducer with the digital voltmeter connected across the output and allow 30 minutes for the transducer to warm up.

9. For a desired output span of one volt between the outputs 18 and 21 and a maximum variation from linearity of ± 0.5%, the final positioning of the connecting links 11 is carried out as described below.

Insert the mild steel tubular core so that it is only just within the end of the transducer carrying the large flange 3. The potentiometer 19 is then adjusted so that the output registered on the digital voltmeter is zero. Insert the mild steel tubular core fully along the length of the transducer and adjust the adjustable potentiometer 16 so that the output voltage is 1.00 volts as shown on the digital voltmeter. Move the tubular core so that the end of the core corresponds with the mark Y1 and adjust the temporary connection X1 of the respective connecting link so that the output voltage is 10% of the full scale (0.100 volts ± 0.001 volts). The remaining links are positioned by moving the core so that the end terminates respectively at the positions Y2, Y3 . . . Y9, and the respective temporary connecting ends X2, X3 . . . X9 are correctly positioned to produce the desired output voltage at any position of the tubular core.

10. Finally, the zero reading is rechecked and the desired output voltage is checked at any position of the core piror to applying an outer insulating layer to enclose the connecting links 11.

Figure 5:
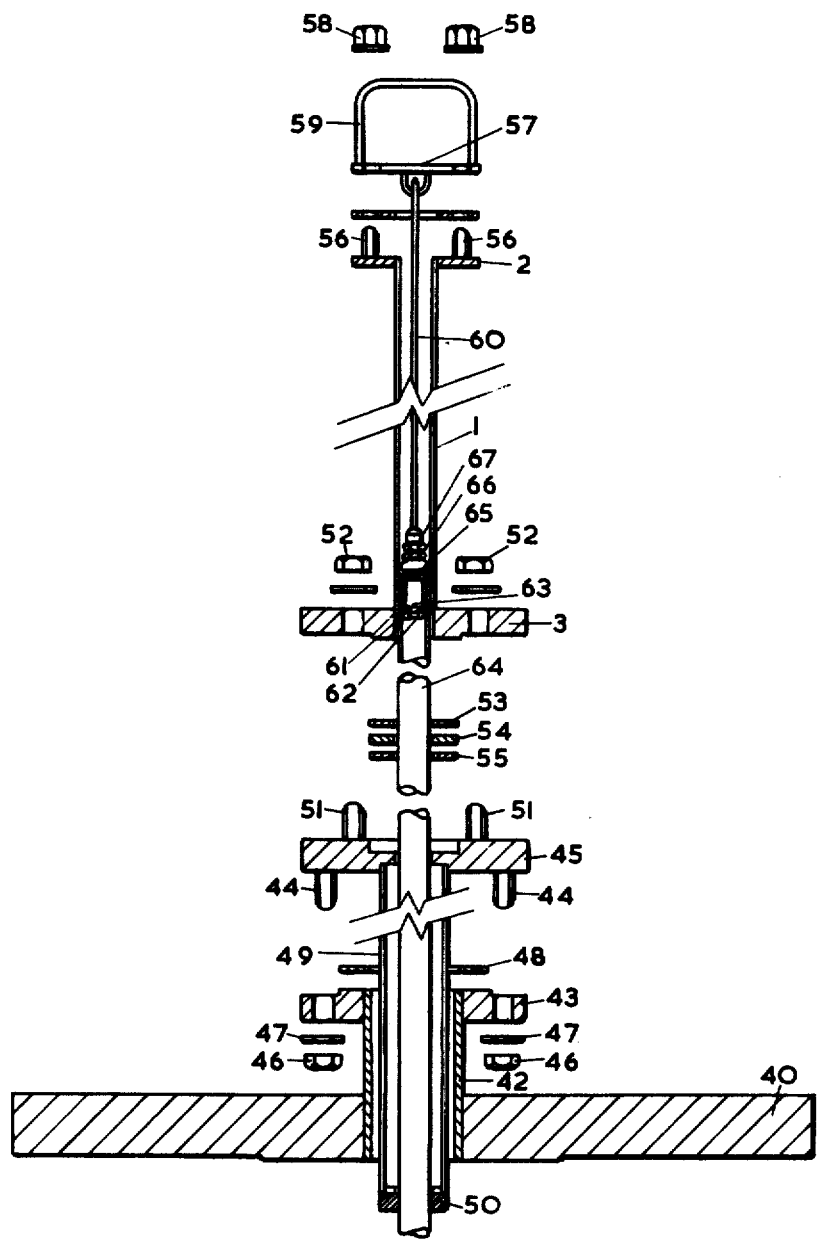
FIG. 5 shows a level sensing device incorporating a transducer as shown in FIGS. 1, 2 and 3.

A level indicating device is shown in FIG. 5 in an exploded view. The device essentially consists of a mounting plate 40 to be mounted on top of a storage vessel 41. The mounting plate 40 has a central aperture within which is securely positioned a short tube 42 carrying at its upper end an annulus 43 drilled to receive studs 44 on an annular supporting plate 45. Studs 44 permit annulus 43 and plate 45 to be securely joined together with nuts 46 and washers 47. A sealing washer 48 is positioned between annulus 43 and plate 45.

Plate 45 is mounted at the top of a tube 49 which extends downwardly through the plate 40 and is provided at this lower end with a sealing washer 50.

The transducer as shown in FIGS. 1, 2 and 3 is shown with its cylindrical former 1 mounted above plate 45 and held in close conformity therewith by means of studs 51 and nuts 52. Sealing washers 53, 54 and 55 are positioned between the end 3 of the transducer and plate 45. The other end 2 of the cylindrical former 1 of the transducer is provided with studs 56 to permit the attachment of a cover plate 57 using nuts 58. The cover plate is provided with a handle 59. A rod 60 formed of non-magnetic material depends from the cover plate 57 within the cylindrical former 1 and is threaded at its lower end and carries a nut 61 and a lower lock-nut 62. A bush 63 is screwed within the upper end of the mild steel tube 64 which forms the core of the transducer. The bush is attached to a sealing washer 65 by means of nuts 66 and 67 and is slidably mounted on the rod 60.

Nut 61 provides a stop for downward movement of the tube 64 within the device and also enables the tube to be withdrawn upwardly through the device by removal of the cover plate 57. Tube 64 passes through the sealing washer 50 at the bottom of tube 40 and is attached to a float 68 located within the vessel 41.

In use the level indicator as shown in FIG. 4 is mounted on the vessel 41 and the transducer with its associated electrical circuitry as shown in FIG. 3 is coupled to a voltmeter or a chart recorder to indicate the voltage output of the transducer from the upper coil 9 as the level of liquid in the tank varies. Float 68 follows the variation in level of the liquid, and movement of the float causes the tube 64 to move within the transducer and produces the output voltage. The recording chart or voltmeter can be calibrated to show directly the level of the liquid in the vessel if desired.

What is claimed is:

1. A transducer comprising a support member having a hollow opening therein for receiving a movable core, said support member having mounted thereon a primary coil connectable to a source of alternating electric current, a secondary coil mounted around the primary coil, a plurality of electrically conductive links axially spaced along the length of the secondary coil each link connecting spaced turns of the secondary coil and the ends of the secondary coil being connectable to output means responsive to the electric current induced in said secondary coil to generate an output voltage having predetermined characteristics, whereby the number and position of said electrically conductive links in said secondary coil determine said characteristics of said output voltage.

2. A transducer according to claim 1 in which the electrically conductive link is a length of wire.

3. A transducer according to claim 1 in which the electrically conductive link is formed by interconnecting the required number of adjacent turns of the secondary coil with conductive material.

4. A transducer according to claim 3 in which adjacent turns of the secondary coil are connected by solder.

5. A transducer according to claim 3 in which the adjacent turns of the secondary coil are connected by a conductive resin or paint composition.

6. A transducer according to claim 1 in which one or more additional secondary coils are mounted around and extend substantially the full length of the primary coil, the outer of which is provided with said electrically conductive links.

7. A transducer according to claim 1 in which the hollow support member is of cylindrical form.

8. A transducer according to claim 1 in which the hollow support member is formed of a non-magnetic material.

9. A transducer according to claim 1 in which the hollow support member is formed of a plastic or resinous material.

10. A transducer according to claim 1 in which the hollow support member has a retaining flange located at each end thereof to support the ends of the coils carried on the support member.

11. A transducer according to claim 1 in which each coil is formed of electrically conductive wire carrying an insulating coating.

12. A transducer according to claim 11 in which the wire has a guage of from 16 S.W.G. to 25 S.W.G.

13. A transducer according to claim 1 in which an insulation layer is positioned between the individual coils and between the primary coil and the support member.

14. A transducer according to claim 1 in which the said secondary coil is formed by a member of short coils spaced along the transducer and connected in series by said conductive links.

15. A transducer according to claim 1 in which there are from 5 to 10 axially spaced electrically conductive links to produce an output across the ends of the said secondary coil of within 5% linearity when said primary coil is connected to a source of alternating electric current.

16. A transducer according to claim 1 in which said output means includes a recorder chart.

17. A transducer according to claim 1 in which a movable core formed of a magnetic material is positioned in the hollow support member whereby said output voltage has substantially linear characteristics when said movable core is progressively inserted in said hollow support member.

18. A transducer according to claim 17 in which the core is connected to a float which is moveable in response to the movement of a liquid.

19. A transducer according to claim 1 in which said secondary coil comprises a plurality of turns wound in the same direction and said secondary coil extends substantially the full length of said primary coil.

20. A transducer comprising a hollow support member having mounted thereon a primary coil connectable to a source of alternating electric current, a secondary coil mounted around the primary coil, a plurality of electrically conductive links axially spaced along the length of the secondary coil, each link connecting spaced turns of the secondary coil, output means responsive to the electric current induced in said secondary coil to generate a substantially linear output voltage and a movable core positioned in said hollow support member, whereby the number and position of said electrically conductive links in said secondary coil determines the linearity of said output voltage when said movable core is progressively inserted in said hollow support member.

21. A transducer according to claim 20 in which the movable core is connected to a float which is movable in response to the movement of a liquid.

22. A transducer according to claim 20 in which said secondary coil comprises a plurality of turns wound in the same direction and said secondary coil extends substantially the length of said primary coil.

23. A transducer according to claim 20 in which one or more additional secondary coils are mounted around and extend substantially the full length of the primary coil, the outer of which is provided with the electrically conductive links.

* * * * *